Figure 8:
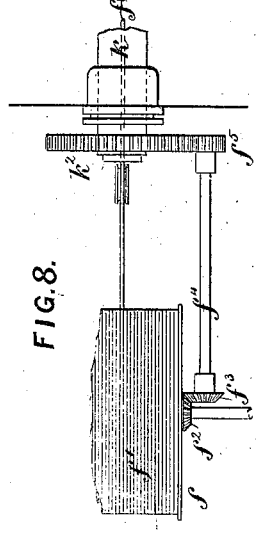

(No Model.) 8 Sheets—Sheet 1.
J. O'KELLY & B. A. COLLINS.
ELECTRIC STEERING APPARATUS FOR TORPEDO BOATS.
No. 388,300. Patented Aug. 21, 1888.

Attest.
H. S. Knight
E. Arthur.

Inventors
James O'Kelly
Bernard A. Collins
by Knight Bros.
Attys.

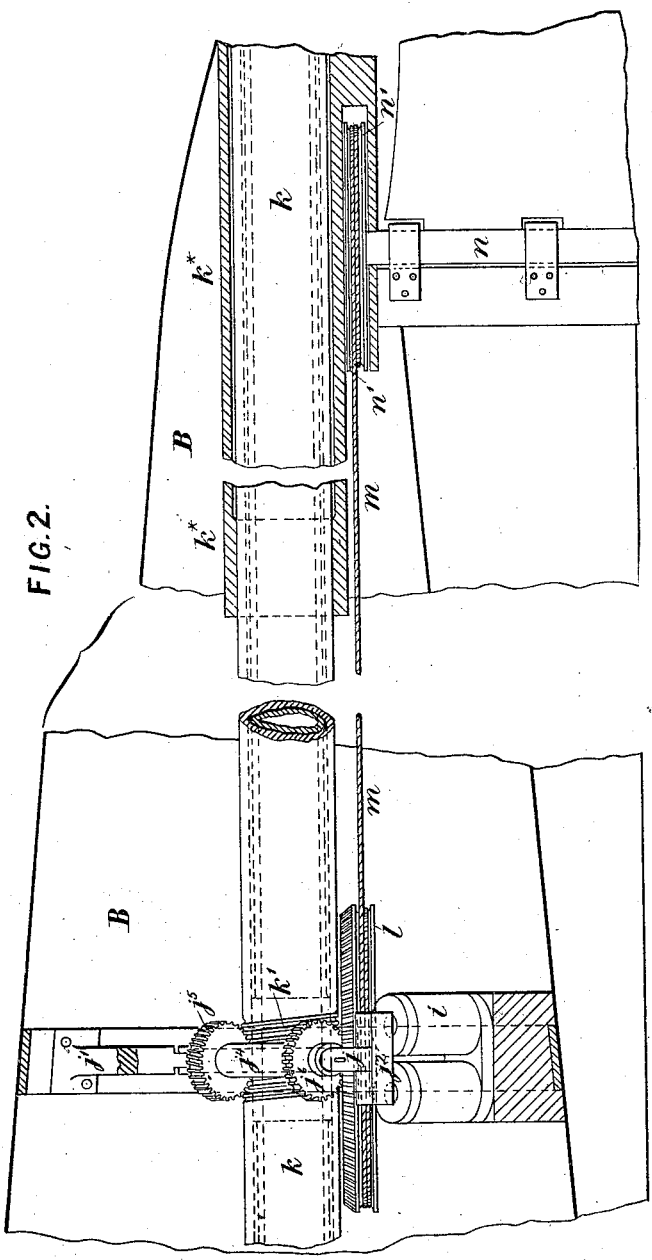

(No Model.) 8 Sheets—Sheet 3.
J. O'KELLY & B. A. COLLINS.
ELECTRIC STEERING APPARATUS FOR TORPEDO BOATS.
No. 388,300. Patented Aug. 21, 1888.

Attest.
H. S. Knight
E. Arthur

Inventors
James O'Kelly
Bernard A. Collins
by Knight Bros.
Attys (No Model.) 8 Sheets—Sheet 4.
J. O'KELLY & B. A. COLLINS.
ELECTRIC STEERING APPARATUS FOR TORPEDO BOATS.
No. 388,300. Patented Aug. 21, 1888.
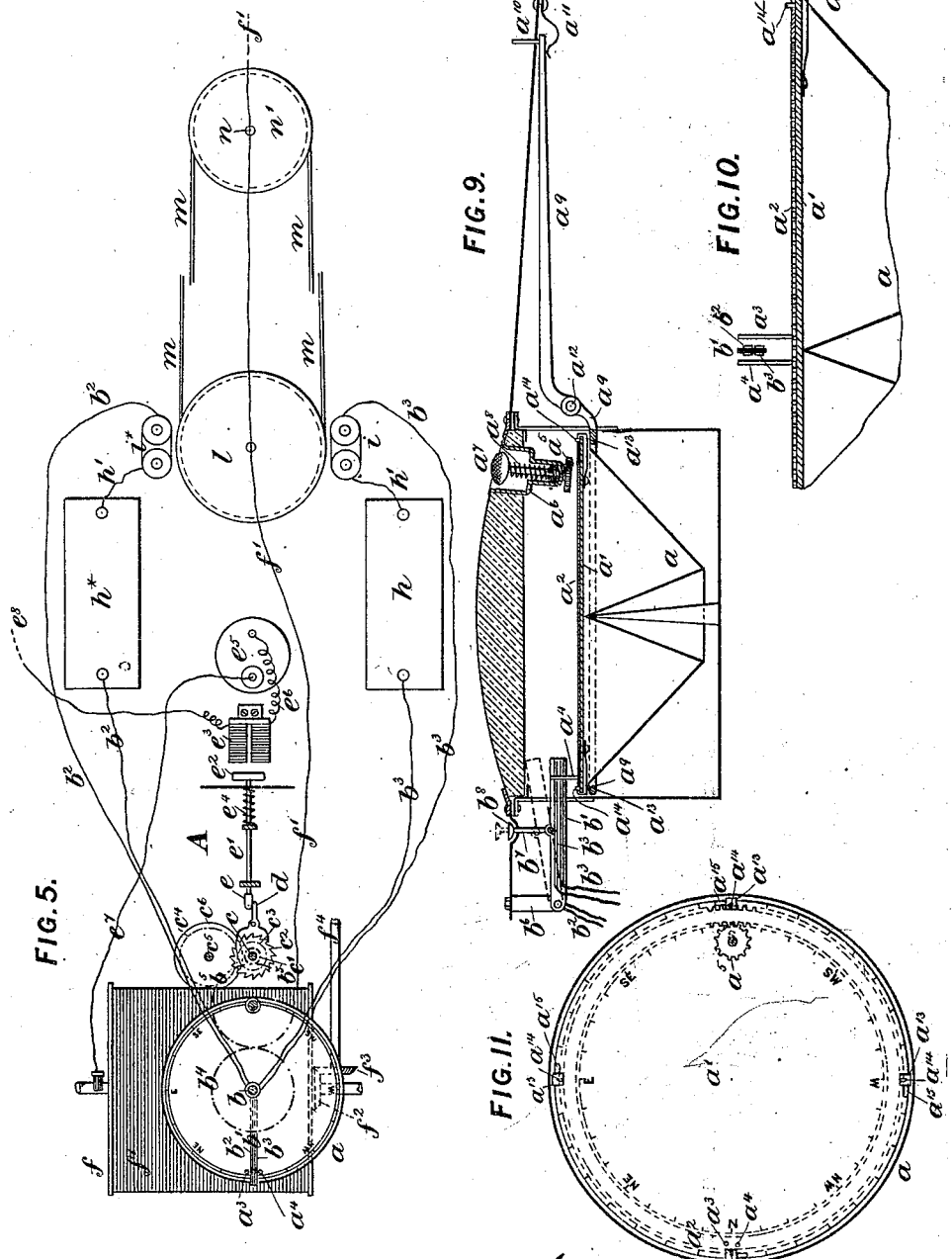

(No Model.)

J. O'KELLY & B. A. COLLINS.
ELECTRIC STEERING APPARATUS FOR TORPEDO BOATS.

No. 388,300. Patented Aug. 21, 1888.

(No Model.) 8 Sheets—Sheet 6.
J. O'KELLY & B. A. COLLINS.
ELECTRIC STEERING APPARATUS FOR TORPEDO BOATS.
No. 388,300. Patented Aug. 21, 1888.
FIG.15. FIG.16.
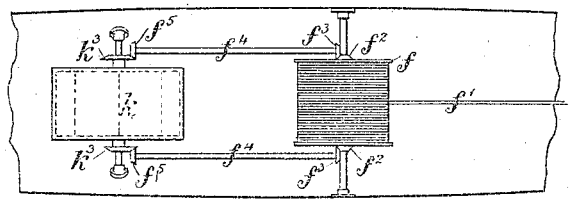
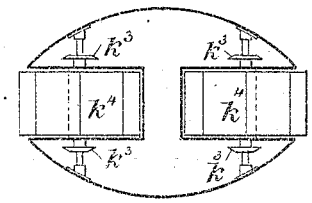
FIG.17.
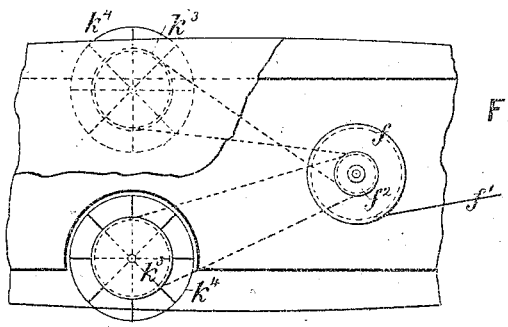
FIG.18. FIG.19.
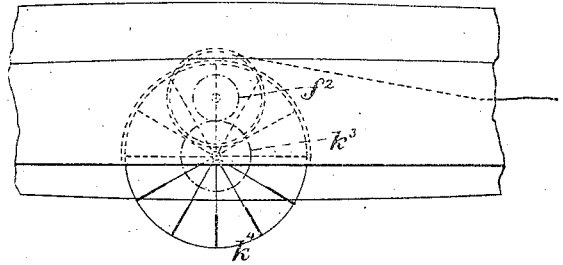
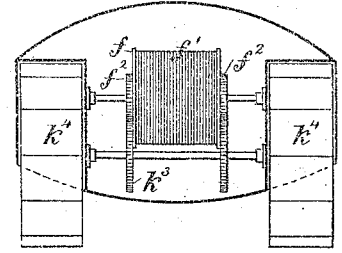

(No Model.) 8 Sheets—Sheet 7.

J. O'KELLY & B. A. COLLINS.
ELECTRIC STEERING APPARATUS FOR TORPEDO BOATS.

No. 388,300. Patented Aug. 21, 1888.

Attest:
H. S. Knight.
E. Arthur.

Inventors
James O'Kelly.
Bernard A. Collins (No Model.) 8 Sheets—Sheet 8.

J. O'KELLY & B. A. COLLINS.
ELECTRIC STEERING APPARATUS FOR TORPEDO BOATS.

No. 388,300. Patented Aug. 21, 1888.

Attest:
H. S. Knight
E. Arthur

Inventors:
Jas. O'Kelly & Bernard A. Collins
By Knight
Attys.

UNITED STATES PATENT OFFICE.

JAMES O'KELLY, OF LONDON, AND BERNARD A. COLLINS, OF 26 MACHELL ROAD, NUNHEAD, COUNTY OF SURREY, ENGLAND.

ELECTRIC STEERING APPARATUS FOR TORPEDO-BOATS.

SPECIFICATION forming part of Letters Patent No. 388,300, dated August 21, 1888.

Application filed January 3, 1888. Serial No. 259,593. (No model.)

*To all whom it may concern:*

Be it known that we, JAMES O'KELLY, of 65 Bessborough Street, London, England, journalist and member of Parliament, and BERNARD AMBROSE COLLINS, of 26 Machell Road, Nunhead, Surrey, England, meteorologist, subjects of the Queen of Great Britain, have invented certain new and useful Improvements in Torpedoes and in Apparatus Connected Therewith, part of which improvements is applicable to the steering of vessels provided with steam steering-gear, of which the following is a specification.

In carrying our invention into effect we use by preference a fish-shaped torpedo divided into air-tight compartments, as usual, for containing the explosive charge, the propelling-charge, and the engine, in addition to which we, according to our invention, provide the torpedo with other air-tight compartments, in which we place steering-gear.

The invention relates to means whereby torpedoes and vessels are rendered self-steering in any previously-determined direction, and whereby, when once started on their course, torpedoes can be controlled from a station and their course altered, so as to cause them to follow a moving object until they strike it.

In order that our invention may be clearly understood and readily carried into effect, we will proceed, aided by the accompanying drawings, fully to describe the same.

Figure 1:
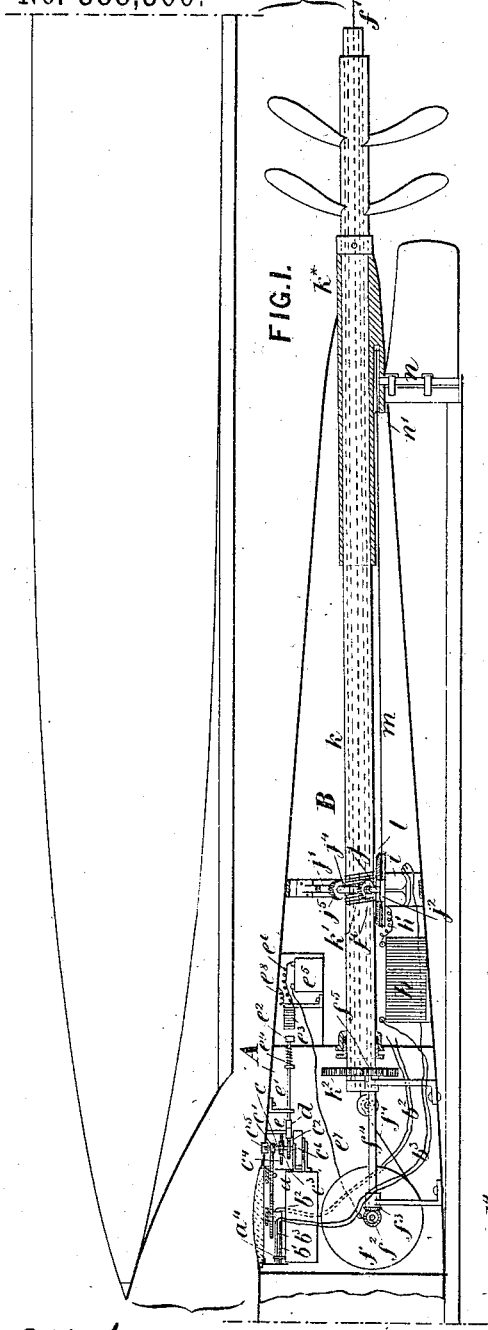
Figure 4:
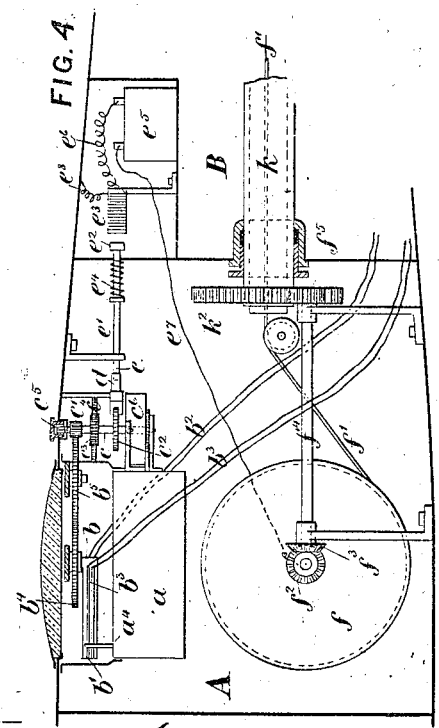
Figure 3:
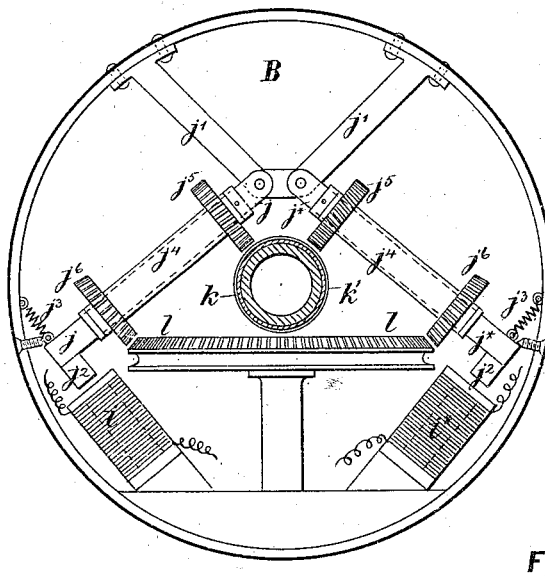
Figure 12:
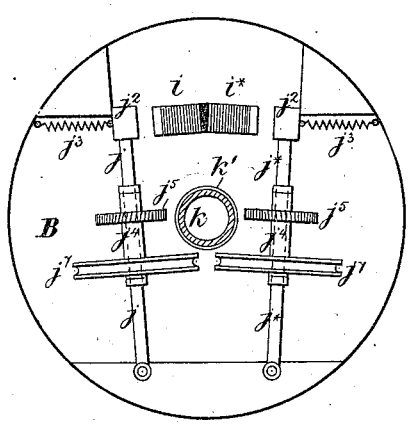
Figure 13:
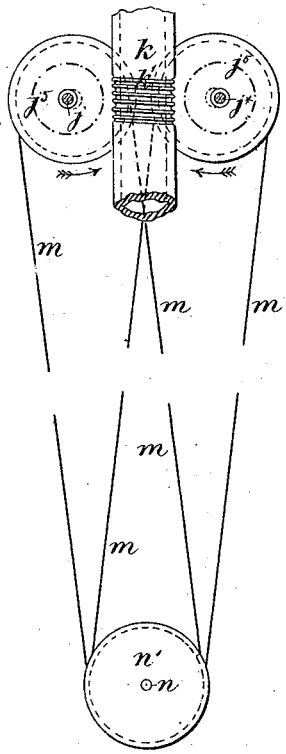
Figures 6, 7:
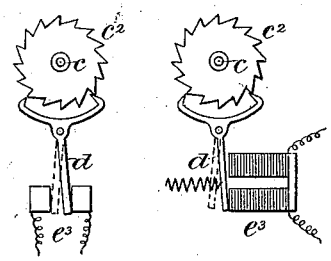
Figure 25:
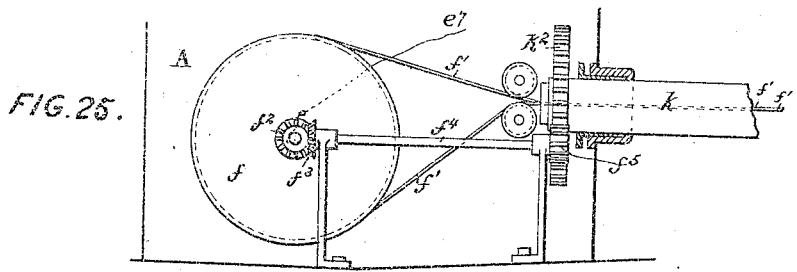
Figure 14:
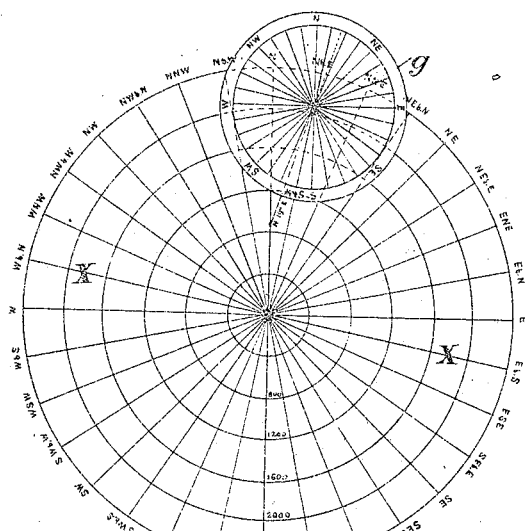
Figure 24:
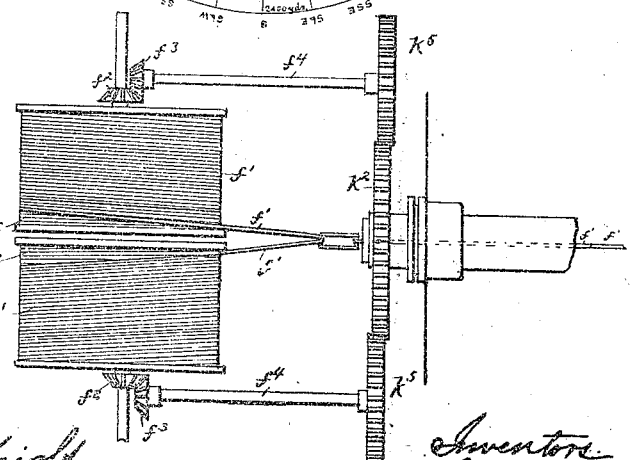
Figure 20:
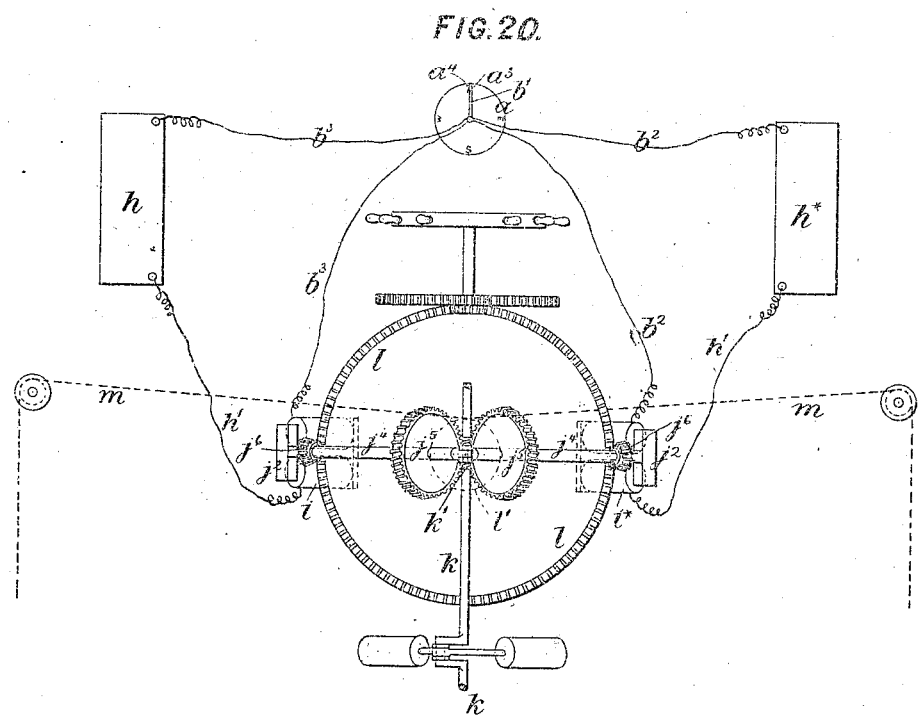
Figure 21:
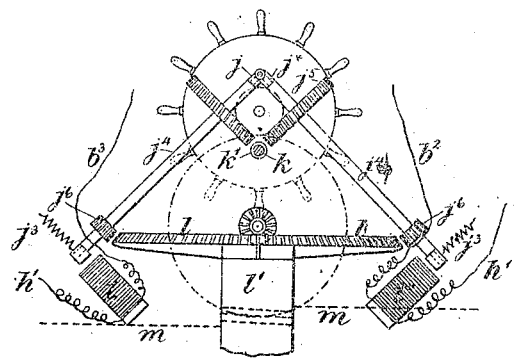
Figure 22:
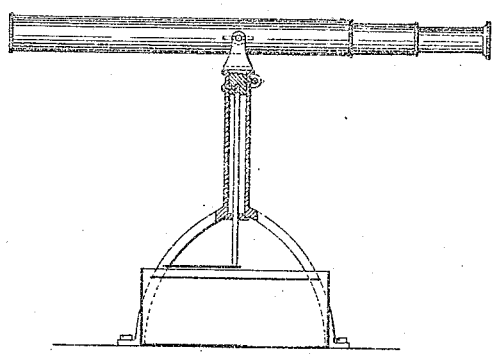
Figure 23:
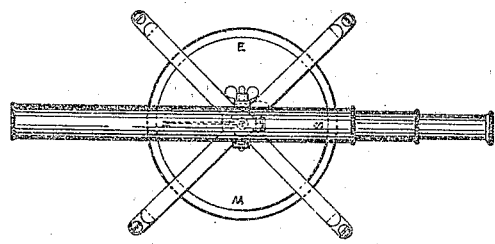

Figure 1 (divided into two parts) represents a longitudinal vertical section of a torpedo constructed according to our invention. Figs. 2 and 3 represent, respectively, portions of an enlarged longitudinal vertical section and a cross-section of the steering-gear shown in Fig. 1. Fig. 4 is an enlarged longitudinal vertical section of the compass mechanism and the propelling mechanism shown in Fig. 1. Fig. 5 is an enlarged plan of the compass mechanism and some parts of the propelling mechanism shown in Fig. 1. Figs. 6 and 7 represent modifications of the compass-escapement mechanism. Fig. 8 represents an enlarged plan of the driving mechanism shown in Fig. 1. Fig. 9 is an enlarged vertical longitudinal section of a modified form of compass mechanism. Fig. 10 is an enlarged vertical cross-section of part of the compass mechanism shown at Fig. 9. Fig. 11 is a plan of the compass shown at Figs. 9 and 10. Figs. 12 and 13 are respectively a vertical cross-section and a plan of a modified form of steering-gear. Fig. 14 is a plan of apparatus employed at a discharging station to enable the position of a torpedo to be ascertained at any part of its course. Figs. 15 and 16 are respectively a longitudinal section and a cross-section of torpedo-propelling means. Fig. 17 is a modification of the arrangement shown at Figs. 15 and 16, and Figs. 18 and 19 represent another modification. Fig. 20 is a plan, and Fig. 21 is a cross-section, showing the application of our steering means to ships or other vessels. Fig. 22 is an elevation, partly in section, and Fig. 23 is a plan, representing the method in which we employ a sighting-rod or telescope in conjunction with the compass-card. Figs. 24 and 25 are respectively a plan view and side elevation of a modification of the driving mechanism.

In all the figures like parts are marked with similar letters and figures of reference.

In carrying out our invention we place in one of the compartments or chambers of the torpedo, preferably the center one, A, a dry ship-compass, $a$, upon the card $a'$ of which is secured a light vulcanite circle, $a^2$. To this circle $a^2$, the outside edge of which is just inside the point and degree-marks, so that they can be readily seen, we secure two vertical silver or copper pins, $a^3$ $a^4$, one preferably one degree east and the other preferably one degree west of the north point of the compass, thus leaving a space of two degrees between them.

Immediately over the center of the compass $a$ we place a vertical shaft, $b$, which carries an arm or hand, $b'$, on its lower end, about one-half an inch from the face of the compass $a$, in such a manner that when the said vertical shaft $b$ revolves on its axis the arm or hand $b'$ will be capable of passing over the face of the compass, just as does the hand of a clock describing a complete circle. The arm or hand $b'$ is conveniently one-eighth of an inch thick and about half an inch wide, and is carried with its edges in a vertical plane. It is composed of vulcanite, ivory, glass, or other suitable non-conducting substance. On each side of the arm or hand $b'$ are secured two silver or copper contact wires, $b^2$ $b^3$, which are perfectly insulated from one another; but the two on either side are capable of being electrically connected, as will now be described. The arm or hand $b'$ is placed between the two vertical pins $a^3$ $a^4$. It is evident that if the arm or hand $b'$ points toward the magnetic north the pins $a^3$ $a^4$ will be equidistant from it, as they are each one degree from the north point of the compass. On the other hand, if the arm or hand $b'$ is turned toward, say, the north-northeast, when between the two vertical pins $a^3$ $a^4$, the effort of the compass $a$ to regain its normal position—that is, with its north point pointing toward the magnetic north—will cause the pin $a^3$ on the right or eastern side to press against the side of the arm or hand $b'$, so that the two contact-wires $b^2$ on that side will be electrically connected by the said pin $a^3$ pressing against them. In like manner, if the arm or hand $b'$ be turned so as to point toward the north-northwest the pin $a^4$ on the left or western side will press against the two wires $b^3$ on the left side of the arm or hand $b'$. It is therefore apparent that if the arm or hand $b'$ be pointed to any direction between north and south on the eastern semi-circle the vertical pin $a^3$ will come in contact with the wires $b^2$ on the right side of the arm or hand $b'$, and when directed to any point on the western semi-circle the vertical pin $a^4$ will come in contact with the two wires $b^3$ on the left side.

The mechanism we prefer to employ for controlling the direction and movements of the vertical shaft $b$ is as follows: The said shaft $b$ has upon it a large wheel, $b^4$, provided with three hundred and sixty teeth on its periphery, or one tooth for each degree of the circle. This wheel $b^4$ is geared by another wheel, $b^5$, of like diameter, to a pinion, $c'$, on a shaft, $c$. To the said pinion-shaft $c$ are secured an escapement-wheel, $c^2$, and a pinion, $c^3$, which is driven by a wheel, $c^4$, on the shaft $c^5$ of a spiral spring, $c^6$, so that when the spiral spring is wound up in the ordinary way by a key at the top of the pinion-shaft $c^5$ and set free the motion of the said shaft $c^5$ is transferred to the shaft $c$, thence to the intermediate wheel, $b^5$, by the pinion $c'$, and thence to the wheel $b^4$, thereby causing the vertical shaft $b$ to revolve on its axis, and consequently the arm or hand $b'$ to move over the face of the compass like the hand of a clock. Now, as the wheels $c'$ $b^5$ $b^4$ would revolve as long as the spiral spring $c^6$ had power, if unchecked, we control their motion by placing an escapement-lever, $d$, in connection with the escapement wheel $c^2$, so that the latter can only move forward one tooth at a time, as in all escapement-movements, and we control the movement of the said escapement-lever in the following manner: A small chock or brake, $e$, is placed at the side or end of the escapement-lever $d$, and it is connected by a rod, $e'$, working in suitable guides, with a small flat piece, $e^2$, of soft iron, which forms the armature of an electro magnet, $e^3$, so that when the said magnet $e^3$ is charged it draws the armature $e^2$ to it, and consequently the chock or brake $e$ is withdrawn from the escapement-lever $d$, thus allowing the latter to act freely, and when the magnet $e^3$ is discharged or has no current passing through it the rod $e'$ is drawn forward again by the spiral spring $e^4$.

To operate the electro-magnet $e^3$, we place an electric battery, $e^5$, of any desired power, in a convenient part of the chamber A, or, if desired, in the last or stern chamber B. This battery $e^5$ is connected as follows: From one pole a wire, $e^6$, leads to one pole of the electro-magnet $e^3$, and from the other pole of the battery a wire, $e^7$, is led to the axle of a drum or reel, $f$, whereon we coil from three to five miles of insulated copper wire $f'$. The connection of the wire $e^7$ with the wire $f'$ is made by passing the end of the latter wire through the hollow axle of the drum or reel to the side, where it is joined to the battery-wire $e^7$, either by a brush or by a swivel-joint, as will be well understood. The drum or reel $f$ is made of wood, vulcanite, or any other suitable non-conducting substance, as are also all the parts of the escapement mechanism above described, excepting, of course, the electro-magnet $e^3$ and armature $e^2$, in order that the sensitiveness of the compass may not be disturbed. The other end of the wire $f'$ is passed through a boring formed longitudinally through the internal shaft upon which the propeller-shaft works, or through a central tube fixed within the torpedo when other propelling means are employed, so that its end may, when desired, be secured on board the vessel or station from which the torpedo is discharged, for purposes which will be explained farther on. That pole of the magnet $e^3$ not connected with the battery $e^5$ is connected by wire $e^8$ with the outer skin of the torpedo, so as to obtain "earth" through the water in which the torpedo is submerged.

We also operate the above-described escapement and electro magnet $e^3$ without using an electric battery within the torpedo by having the battery on the discharging ship or station and sending the current through the wire $f'$; or we use both batteries, making the battery $e^5$ in the torpedo a relay-battery, to augment the current sent from the battery on the discharging vessel or station.

The above-described mechanism and electrical connections are for the purpose of enabling the course of the torpedo to be directed at any desired time, and their operation is as follows: Upon the vessel or station from which the torpedo is to be discharged we place a compass, escapement-gearing, and connections similar in every way to those in the torpedo. The arm or hand over the ship's or station compass points exactly in the same direction as the hand or arm $b'$ over the compass $a$ in the torpedo, and as the wheels and escapements connected with both hands are exactly the same the arms or hands will move in unison when they are both set free, and as their movement will be synchronous they will point always in the same direction, no matter what part of the dial is indicated. The compass, hand, and escapement are controlled by an electro magnet on the discharging vessel or station, just as are the compass, hand, and escapement in the torpedo, so that when the end of the insulated wire $f'$ from the torpedo is brought in contact with one of the poles of the electro-magnet on the discharging vessel or station the circuit will be closed—that is, the current will pass along the wire $f'$ to and over the drum or reel $f$ to the electro-magnet $e'$ in the torpedo, and thence through the earth to the electro-magnet on the discharging vessel or station. Thus it will be seen that the two electro-magnets will release the escapement-levers at the same instant, and consequently the escapements, both on the torpedo and discharging vessel or station, will operate synchronously, and will move the hands or arms $b'$ equally around the face of both compasses. When contact is broken, the breaks or chocks $e$ will stop the movements of both escapements, so that the arms or hands will rest pointing in exactly the same direction.

Now, in connection with the above-described mechanism, we use the apparatus described with reference to Figs. 1 and 4. On board the discharging vessel we use another ship-compass, which is perfectly free to act, while at a fixed station a fixed compass-card may be used. Above it—that is to say, above the moving compass or the fixed card—however, we center a horizontal rod on a pivot, so that it can be directed to any part of the horizon. This rod, or it may be a telescope, (see Figs. 22 and 23,) has cross-hairs at both ends, so that an object can be seen by placing the eye at one end of it. This rod we call the "sighting-rod," and it is for the purpose of obtaining the magnetic direction of any object on the horizon. We will now describe its use in connection with the foregoing directing mechanism.

The sighting rod or table is above table X, as shown in accompanying sketch.

The sighting-rod is directed toward, say, a vessel. When she is cut by the cross hairs, the compass underneath shows exactly the magnetic direction in which the sighting-rod lies, and consequently the direction of the object-vessel. For instance, suppose it to point toward the northwest by north; by pressing a button, by which we close a circuit, as before described, the chocks or breaks $e$ are withdrawn from the escapement levers $d$ of both the torpedo's and discharging vessel's compass mechanism, and the arms or hands $b'$ over both compasses will move round until they force the north points of the compasses to the north-east by north, (the opposite direction to that given by the free compass.) Now it will be seen that when the north point of the torpedo's compass points to north-east by north the north-west by north point will be directly in a line with the axis of the torpedo; hence the torpedo would have to be turned round thirty-three degrees forty-five seconds toward the west before the compass would point to the north freely and the pin $a^3$ be released from contact with the side of the arm or hand $b'$.

We will now proceed to show how we accomplish the changing of direction of the torpedo, so as to follow any course set as above.

The arm or hand $b'$, as before described, carries on its sides the two sets of contact-wires $b^3 b^2$. These two sets of wires are called the "port" and "starboard" wires, respectively, and are carried to the stern-chamber B, where they are connected as follows: One of the port-wires, $b^3$, is connected with one pole of a storage or chemical battery, $h$, while the other is connected with one pole of an electro-magnet, $i$. The other pole of the battery $h$ is connected with the opposite pole of the electro-magnet $i$ by a wire, $h'$. This is on the port side. The other wires, $b^2$, are similarly connected with another battery, $h^*$, and electro-magnet $i^*$ on the starboard side. It will be seen that if the left pin, $a'$, on the compass comes in contact with the wire $b^3$ on the left or port side of the arm or hand $b'$ the circuit will be closed and the port-battery $h$ and connected electro-magnet $i$ will operate. In like manner if the other pin, $a^3$, comes in contact with the wires $b^2$ on the right side of the arm or hand $b'$ the circuit will be closed and the battery $h^*$ and electro-magnet $i^*$ on the starboard side will operate.

Over the propeller-shaft in the stern-chamber B (see Figs. 1, 2, and 3) we hinge two arms, $j j^*$, to a support, $j'$, so that they form an angle with each other and extend downward to each side, so that the lower ends, $j^2$, come opposite the port and starboard electro-magnets $i i^*$, respectively. These ends $j^2$ are formed into oblong shape and faced with blocks of soft iron, so as to act as armatures for the electro magnets before described, and are held away from said magnets by spiral springs $j^3$. Upon the said arms $j j^*$ we place outer shafts, $j^4$, which carry two wheels, $j^5 j^6$, each. These wheels are so arranged that when the electro-magnet on one side draws the arm toward it one wheel, $j^5$, will gear into a worm or screw, $k'$, on the propeller-shaft $k$, and the other, $j^6$, into a horizontal wheel, $l$, to be hereinafter described. In the same manner the electro-magnet on the other side will cause similar wheels, $j^5 j^6$, to be drawn to the propeller-shaft and horizontal wheel $l$. The wheel $l$ is placed horizontally under the propeller shaft $k$, loosely upon a bearing, so that it can move in any direction horizontally. On the upper portion of its periphery we form beveled teeth, so that it can be geared with the lower wheel, $j^6$, on either arm $j j^*$ when the upper wheel, $j^5$, is geared with the worm or screw $k'$ on the propeller-shaft $k$ by the magnet $i$ or $i^*$ drawing the arm toward it. The edge or periphery of the horizontal wheel $l$ is grooved so as to hold one or more turns of a chain or wire line $m$. This line $m$ is carried underneath the outer shield or shaft, $k^x$, to the rudder wheel $n'$, around which it is turned one or more times. This rudder-wheel $n'$ is firmly secured to the head of the rudder-post $n$, so that when it turns the rudder will also turn.

The operation of the above-described mechanism and electric connections is as follows: Suppose the propeller-shaft $k$ is revolving and that the left pin, $a'$, on the compass comes in contact with the left or port wires, $b^2$, on the arm or hand $b'$, the circuit will be closed for the port-battery $h$, and the electro-magnet $i$ will draw down the arm $j$ toward it. The wheels $j^5 j^6$ on said arm are thereby brought into gear with the worm or screw $k'$ and the beveled teeth of the horizontal wheel $l$ respectively, with the result that power will be transferred from the propeller-shaft $k$ to the horizontal wheel $l$, so as to cause it to rotate. The chain or line $m$ from the horizontal wheel $l$ will communicate the same movement to the rudder-wheel $n'$, so that the helm will be ported until the arm or hand $b'$ ceases to touch the left pin, $a'$. In a similar way the contact between the right or starboard wires, $b^3$, and the right pin, $a^2$, will cause the starboard battery $h^2$ and electro-magnet $i^2$ to act, and the wheels $j^5 j^6$ on that side will cause the horizontal wheel $l$ to rotate in the opposite direction, so as to starboard the helm. Now, suppose the compass-hand $b'$ of the torpedo were set, as before explained, to north east by north, and the torpedo launched, no matter in what direction, the right pin, $a^2$, will come in contact with the right or starboard wires, $b^3$, causing the starboard electro-magnet $i^2$ to gear the wheels $j^5 j^6$ with the worm $k'$ on the propeller shaft $k$ and with the horizontal wheel $l$. The helm will therefore be starboarded until the torpedo changes its course to north-west by north, when, as the north point of the compass will be pointing along the magnetic meridian, the pin $a^2$ will cease to touch the arm or hand $b'$, which latter will then stand centrally between the two pins; consequently the electro-magnet $i^2$ will cease to act and the corresponding arm will be drawn away by its connected spiral spring. The horizontal wheel $l$, being then free to move, will turn back to its normal position—that is, so as to have the rudder exactly on a line with the axis of the torpedo, and the latter will move on a straight line in the course given it. Should, however, the object-vessel alter its course, one tap on the button connecting the directing-escapements will alter the course of the torpedo one degree, so that any change can be met. The wire $f''$ on the drum or reel $f$ pays out as the torpedo moves, so that it will not in any way retard the progress of the latter.

In using the above-described mechanism and electric connections we claim the right to operate the escapement-lever $d$ by direct electric power without using the spiral spring—that is, we operate the escapement-lever $d$ by either reversing the current in the electro-magnet $e^2$ and having the tongue of the escapement-lever $d$ between the poles of such magnet, as represented at Fig. 6, or by using a current to operate the escapement-lever in one direction and bringing it back by a spiral spring, as represented at Fig. 7. Other arrangements of mechanism electrically operated or controlled and connected by a conducting-wire with a directing ship or station may, however, be employed to operate the compass hand or arm $b'$ without departing from the peculiar character of this part of our invention.

As a modification of the apparatus for giving motion to the rudder-wheel, we may use the modification represented at Figs. 12 and 13, in which we use two shafts, $j^4$, mounted on arms $j j^x$, pivoted at their lower ends and acted upon at their upper ends each by an electro-magnet, $i$ or $i^2$, and spiral spring $j^3$, so that when the circuit is completed either of said arms $j j^x$ may be attracted to its magnet, in order to bring a toothed wheel, $j^5$, on said shaft $j^4$ into gear with the worm or screw $k'$ before mentioned. Each of said shafts $j^4$, at or near its lower end, carries a grooved wheel, $j^7$, around and from which a cord or connection, $m$, is passed to the rudder-wheel $n'$.

In connection with the above-described compass, escapement, and electrical connections, and for the purpose of ascertaining the exact location of torpedoes from time to time after their being launched or discharged, we use a circular table, X, as represented at Fig. 14, preferably about three feet in diameter, upon which an enlarged face of a compass is marked, the radiating degree-lines being drawn from the center to the edge. This compass-face is drawn to any desired scale—that is, the radiating lines represent distance-lines on any required scale of feet or yards—such as, say, four hundred yards to the inch. This scale would make the distance between the center and the edge of the table-compass X represent two thousand four hundred yards. We also use a disk, $g$, of glass, mica, or other transparent substance, preferably about one foot in diameter, upon which is marked the face of a compass, the degree-lines radiating from the center. This disk is movable and can be adjusted to any portion of the table-compass X in the following manner: The center of the table-compass card X always represents the position of the station or vessel from which the torpedo is launched. When the sighting-rod or telescope is directed toward the object-vessel and the course set on the torpedo-compass and station-directing compass, the approximate distance of the object-vessel is marked on the table-compass by a pin. The torpedo moves upon the course set, and as its rate of progress is known its position can always be estimated upon the table-card by applying the distance run to the scale on the tadiating lines. The disk before described is placed with its center on the pin marking the object-vessel, and its radiating lines are brought so as to correspond with those of the table-card. It now becomes apparent that if a line were drawn from the estimated position of the torpedo through the center of the disk the radiating line on the disk corresponding with the lines so drawn would indicate the compass position of the torpedo as calculated from the object-vessel. Should the object-vessel remain stationary, that direction would be represented by a line from the center of the table-card X to the center of the disk, or the prolongation of the same degree lines of both cards. If, however, the object-vessel moved upon the disk being changed to the new position, the line drawn from the center of it to the position of the torpedo would give the direction it would be necessary to change the torpedo to in order to make it follow the object-vessel's movement. The new direction is set upon the torpedo in the manner before set forth, as are all such changes necessary to bring the torpedo into contact with the object-vessel. Thus no matter how often the object-vessel may change her position the torpedo can be made to follow her.

The modification represented at Figs. 9, 10, and 11 is to be used in cases where it is desired to dispense with the connections between the discharging vessel or station and the torpedo and to provide the latter with self-contained steering mechanism, which, before the launching of the torpedo, can be set to steer it in any required direction. According to this modification we employ a dry ship-compass, $a$, upon the card $a'$ of which is secured, with capability of being turned thereon, a light vulcanite or other non-conducting circle, $a^2$, carrying two pins, $a^3 a^4$, of similar character to what has been described with respect to the arrangement shown at Figs. 1, 4, and 5, except that in the modification the circle $a^2$ has formed on its inner edge a circle of teeth which are capable of gearing with a toothed pinion, $a^5$, on the lower end of a spindle, $a^6$, when the said pinion is depressed by acting upon the knob $a^7$, fixed thereto. The toothed pinion $a^5$ is normally kept raised out of gear with the teeth of the circle $a^2$ by means of a spiral spring, $a^8$; also, instead of mounting the hand or arm $b'$ on a central axis over the compass, as described with respect to the first arrangement, we, according to the modification now being described, hinge such arm $b'$ in a line, fore and aft of the torpedo, to a fixed stud, $b^6$, outside the compass-card, but with the arm $b'$ passing over the edge of the compass-card and between the vertical pins $a^3 a^4$. We also connect to such arm $b'$ a link, $b^7$, with its head $b^8$ exterior of the torpedo case, and we employ a stop-lever, $a^9$, one arm of which extends underneath the compass card, while the other arm is provided with a pin or stud, $a^{10}$, which passes through the torpedo-case, and said arm is acted upon by a spring, $a^{11}$, to keep it normally in the position shown in the drawings. This lever $a^9$ is pivoted at $a^{12}$, and is employed to prevent rotation of the compass-card at the time, when the circle $a^2$ is being rotated by the toothed pinion $a^5$. Spring clutch-stops $a^{13}$ are mounted on the compass-card $a'$, which are provided with catches $a^{14}$, taking between teeth on the periphery of the circle $a^2$, so that on the stop-lever $a^9$ being raised the catches $a^{14}$ are lifted clear of the circle $a^2$, thus allowing it to be rotated for setting the same in relation to the compass-card $a'$, and on the stop-lever $a^9$ being returned to its normal position the compass-card $a'$ and circle $a^2$ are clutched together, so that by operating the pinion $a^5$ the compass-card $a'$ can be rotated and the pins $a^3 a^4$ be placed underneath the arm $b'$. Guide-pieces $a^{15}$ are fixed to the compass-card $a'$ to guide the circle $a^2$ in its motion. The arm $b'$ is provided with the contact-wires $b^2 b^3$, which are connected with batteries, electro-magnets, and steering-gear within the torpedo, of the character described with respect to the first arrangement.

When it is desired to adjust the steering apparatus so as to steer the torpedo in any given direction, the outer arm of the lever $a^9$ is depressed by the stud $a^{10}$, so as to hold the compass card $a'$ from rotation, the arm or hand $b'$ is raised, as shown by the dotted lines in Fig. 9, so as to be clear of the pins $a^3 a^4$, and the toothed pinion $a^5$ is pressed down into gear with the teeth of the circle $a^2$ and rotated until the pins $a^3 a^4$ on such circle are brought to the position required in relation to the points on the compass-card $a'$. The stop-lever $a^9$ is then allowed to resume the position shown in Fig. 9, so as to allow the compass-card $a'$ to be again locked with the ring $a^2$, and to be rotated by the pinion $a^5$ until the space between the pins $a^3 a^4$ comes into a line with the central line of the torpedo. The arm or hand $b'$ is then allowed to fall between such pins $a^3 a^4$, after which the torpedo is ready to be sent on its course. The action of the compass upon the steering-gear as the torpedo is being propelled through the water is similar to that described with respect to the first arrangement, except that the direction of steering is not controlled from the discharging ship or station.

At Figs. 20 and 21 we represent a method in which we apply this part of our invention to the steering of vessels provided with steam steering-gear. We employ the compass-card and fittings described with respect to Figs. 9, 10, and 11, in combination with the steering-gear as shown at Figs. 20 and 21, which latter apparatus is similar to that shown at Figs. 1, 2, and 3, except that the shaft $k$, carrying the worm or screw $k'$, is driven by steam-power, and instead of passing the tiller-cord $m$ around a groove on the horizontal wheel $l$ it is passed round a thick post or shaft, $l'$, carrying such horizontal wheel $l$, and thence around guide-pulleys to a wheel, $n'$, on the head of the rudder-post $n$.

For the propulsion of torpedoes we utilize the drum $f$, referred to in the foregoing description of the steering apparatus as having the insulated copper wire $f'$ coiled upon it, in the following manner: Our first arrangement is represented at the lower part of Fig. 1 and in Figs. 4, 5, and 8. Upon the axis of the drum $f$ we place a beveled toothed wheel, $f^2$, of suitable size. To this wheel we gear another beveled wheel, $f^3$, so that they revolve at right angles with each other. The beveled wheel $f^3$ is fixed on a shaft, $f^4$, placed parallel with the axis of the torpedo, and being of such a length as to come opposite the inner end of the propeller-shaft $k$. Upon the propeller-shaft $k$ is fixed a toothed wheel, $k^2$, so that a toothed pinion, $f^5$, fixed on the end of the shaft $f^4$, will gear into it. We may use two drums $f$, shafts $f^4$, and connected gearing, as shown in Fig. 24. In such case we carry the insulated wire $f'$ from the top of one drum $f$, through the internal shaft, as before explained, while the insulated wire $f'$ from the other drum is carried from the bottom, and thence through the internal shaft. (See Fig. 25.) This is done to give a reversed motion of the drums, so that the toothed wheels and shafts will transfer the power from the revolving drums in such a manner that they will tend to revolve the toothed wheel $k^2$ on the propeller-shaft in the same direction.

The use of drums for propelling torpedoes by unwinding wire or cord therefrom is not new; but according to our invention we use said lines of wire for the additional purpose of electrical connections between the discharging vessel or station and the torpedo.

The foregoing mechanism connected with the drum or drums is intended to operate as follows: Upon the discharging-vessel, or at the discharging-station, is placed a large wheel of suitable dimensions, having a groove or grooves in its periphery to hold the wire or wires as it or they is or are wound in. The end or ends of the wire or wires $f'$ is or are connected with the axle of the large wheel, and thence to the battery and electro-magnet escapements, before mentioned as operating the synchronous escapements in connection with the discharging ship's and torpedo's compasses, so that when the operation of winding in the line $f'$ is going on the electric connections are unimpaired. To propel the torpedo, the large wheel before mentioned is set in motion, and as it winds in the line $f'$ it causes the drum or drums in the torpedo to revolve. This motion is transferred to the propeller-shaft through the gearing before described, so that the propeller is caused to revolve and force the torpedo ahead. We also use the drum or drums $f$ to propel the torpedo in the following manner, as represented at Figs. 15 and 16: We place a beveled toothed wheel, $f^2$, on each end of the drums, and we communicate motion therefrom by beveled wheels $f^3$ shafts $f^4$, and beveled pinions $f^5$ to beveled wheels $k^3$, fixed on the ends of horizontal paddle-wheels $k^4$, so mounted in casings or chambers formed in the sides of the torpedo that a portion of such paddle-wheels $k^4$ extends on either side of the torpedo, the other parts being inclosed in the casings or chambers, so as not to come into contact with the water—that is, the outside part of each paddle-wheel $k^4$ will act to propel the torpedo, but the other parts will revolve within the casings or chambers.

At Fig. 17, which is a plan view, we have represented the paddle-wheels $k^4$ to be driven by endless bands or chains from wheels fixed on the axis of the drum $f$. We also use the paddle-wheels revolving at each side of the torpedo vertically, as in a paddle-steamer, the upper part being securely cased, or we place them in cases within the torpedo, as represented at Figs. 18 and 19, so that the paddles extend the required distance below the bottom of the torpedo. In this case spur-pinions $f^2$ are fixed, one on each side of the drum $f$, which pinions gear directly into spur-wheels $k^3$, fixed on the axis of the paddle-wheels $k^4$.

We should here remark that although we have described several arrangements for propelling torpedoes, we do not claim any of such arrangements, except so far as the propelling-wire is also used as an electric conductor between the discharging ship or station and the torpedo.

Having now particularly described and ascertained the nature of our said invention and in what manner the same is to be performed, we declare that what we claim is—

1. In a torpedo, the combination, with the rudder, a wheel for controlling the rudder and interlocking mechanism between the rudder-wheel and propeller-shaft controlled by an electro-magnet, of a compass and a pivoted arm over the same carrying the ends of said magnet's conductors, the said compass carrying a conductor adapted to contact with said arm and complete circuit of the magnet, substantially in the manner described.

2. The combination, with the herein-described steering mechanism controlled by the contact of the compass-conductor with the pivoted arm, of means for controlling the rotation of said arm from a distant place, consisting of clock mechanism gearing with a pinion on the arm's axis, a chock or brake engaging a wheel in the clock mechanism, and an electro-magnet controlled by a make and break at the distant place for operating the brake to release said clock mechanism, as set forth.

3. The combination, with a torpedo, of a compass-card, $a'$, non-conducting circle $a^2$, vertical pins $a^3$ $a^4$, axis $b$, arm $b'$, conducting-wires $b^2$ $b^3$, clock-work mechanism for rotating the arm $b'$, brake $c$, rod $c'$, armature $c^2$, electro-magnet $c^3$, spring $c^4$, batteries $c^5$ $h^*$, conducting-wire $f'$, electro-magnets $i$ $i^*$, arms $j$ $j^*$, shafts $j^4$, wheels $j^5$ $j^6$, worm or screw $k'$, wheel $l$, chain, cord, or wire $m$, rudder-wheel $n'$, and similar steering-controlling mechanism on the discharging ship or station connected by the conducting-wire $f'$ with the above-mentioned mechanism of the torpedo, substantially as herein shown and described.

4. In combination with steering mechanism contained within a torpedo, a conducting-wire, $f'$, connected therewith and with mechanism on the discharging ship or station, consisting of compass-card $a'$, hand or arm $b'$, axis $b$, conducting-wires $b^2$ $b^3$, clock-work mechanism for rotating the arm $b'$, and brake apparatus $e$, $e'$, $e^2$, $e^3$, $e^4$, and $e^5$, substantially as herein described.

5. In combination with a torpedo, a wire, $f'$, connecting the torpedo with a discharging ship or station and serving the double purpose of a mechanically-propelling wire and an electric conducting-wire to connect the steering-regulating apparatus on the discharging ship or station with that in the torpedo, substantially as herein described.

6. In the steering mechanism of ships and torpedoes, the combination of a compass-card, $a'$, non-conducting toothed circle $a^2$, pinion $a^5$, lever $a^9$, vertical pins $a^3$ $a^4$, axis $b$, arm $b'$, link $b^7$, wires $b^2$ $b^3$, batteries $h$ $h^*$, electro-magnets $i$ $i^*$, arms $j$ $j^*$, shafts $j^4$, wheels $j^5$ $j^6$, power worm or screw $k'$, horizontal wheel $l$, chain, cord, or wire $m$, and rudder-wheel $n'$, substantially as herein shown and described.

Dated this 11th day of November, 1887.

JAMES O'KELLY.
BERNARD A. COLLINS.

Witnesses:
J. B. MILLS,
B. M. WHITE,
*Both of 23 Southampton Buildings, London.*